United States Patent
Yamaji et al.

(10) Patent No.: US 11,126,652 B2
(45) Date of Patent: Sep. 21, 2021

(54) RETRIEVAL DEVICE, RETRIEVAL METHOD, AND COMPUTER PROGRAM PRODUCT

(71) Applicant: KABUSHIKI KAISHA TOSHIBA, Tokyo (JP)

(72) Inventors: Yuto Yamaji, Kanagawa (JP); Tomoyuki Shibata, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 51 days.

(21) Appl. No.: 16/286,420

(22) Filed: Feb. 26, 2019

(65) Prior Publication Data
US 2020/0089703 A1 Mar. 19, 2020

(30) Foreign Application Priority Data
Sep. 13, 2018 (JP) .............................. JP2018-171161

(51) Int. Cl.
*G06F 16/532* (2019.01)
*G06K 9/62* (2006.01)
*G06N 20/00* (2019.01)
*G06F 16/538* (2019.01)
(Continued)

(52) U.S. Cl.
CPC .......... *G06F 16/532* (2019.01); *G06F 16/538* (2019.01); *G06F 16/583* (2019.01); *G06K 9/46* (2013.01); *G06K 9/6256* (2013.01); *G06N 20/00* (2019.01)

(58) Field of Classification Search
CPC .... G06F 16/532; G06F 16/538; G06F 16/583; G06K 9/6256; G06K 9/46; G06K 9/72; G06K 9/00362; G06K 9/6201; G06N 20/00
See application file for complete search history.

(56) References Cited

U.S. PATENT DOCUMENTS

| 8,891,880 B2 | 11/2014 | Oami et al. |
| 9,495,754 B2 | 11/2016 | Oami et al. |

(Continued)

FOREIGN PATENT DOCUMENTS

| JP | 2009-026254 A | 2/2009 |
| JP | 5664553 B2 | 2/2015 |

(Continued)

OTHER PUBLICATIONS

T. Watanabe, et al., "Co-occurrence histograms of oriented gradients for pedestrian detection", PSIVT 2009, LNCS 5414, pp. 37-47, Springer-Verlag Berlin Heidelberg 2009.

(Continued)

*Primary Examiner* — Albert M Phillips, III
*Assistant Examiner* — Fatima P Mina
(74) *Attorney, Agent, or Firm* — Knobbe, Martens, Olson & Bear, LLP

(57) ABSTRACT

According to one embodiment, a retrieval device includes one or more processors configured to retrieve a plurality of search image regions from an intended image through image search using a search query, extract a plurality of learning image regions from a learning image used in learning of the image search, through the image search using the search query, and display the search image regions and the learning image regions on a display.

12 Claims, 12 Drawing Sheets

(51) Int. Cl.
*G06K 9/46* (2006.01)
*G06F 16/583* (2019.01)

(56) References Cited

U.S. PATENT DOCUMENTS

| | | | | |
|---|---|---|---|---|
| 2001/0012393 | A1* | 8/2001 | Yonezawa | G01N 21/8803 382/145 |
| 2009/0080711 | A1* | 3/2009 | Yokoi | G06K 9/629 382/116 |
| 2010/0150424 | A1* | 6/2010 | Nepomniachtchi | H04N 1/00204 382/140 |
| 2011/0004786 | A1* | 1/2011 | Morita | G06F 11/0727 714/6.32 |
| 2011/0072048 | A1* | 3/2011 | Hua | G06F 16/58 707/780 |
| 2018/0144074 | A1 | 5/2018 | Yamaji et al. | |

FOREIGN PATENT DOCUMENTS

| | | | |
|---|---|---|---|
| JP | 2016-167237 | A | 9/2016 |
| JP | 2018-081654 | A | 5/2018 |

OTHER PUBLICATIONS

Y. Lin, et al., "Improving Person Re-identification by Attribute and Identity Learning", University of Technology Sydney, 2017.

J. C. Niebles, et al., "Unsupervised learning of human action categories using spatial-temporal words", Int. J. Comput. Vis., 2008.

\* cited by examiner

RETRIEVAL DEVICE, RETRIEVAL METHOD, AND COMPUTER PROGRAM PRODUCT

CROSS-REFERENCE TO RELATED APPLICATIONS

This application is based upon and claims the benefit of priority from Japanese Patent Application No. 2018-171161, filed on Sep. 13, 2018; the entire contents of which are incorporated herein by reference.

FIELD

Embodiments described herein relate generally to a retrieval device, a retrieval method, and a computer program product.

BACKGROUND

Conventionally, retrieving an intended subject from an image is known. For example, retrieving a person from an image generated by a monitoring camera, using a search query such as text for identifying the colors of clothes of the person, and displaying the retrieved person is known.

A search query is an effective query form that users can easily handle, however, due to the property of a textual search query, images identified through textual representation can be various in terms of the range of expression. The range of expression conceived by users may not match the range conceived by system designers, resulting in unintended search results.

Considering receipt of a search query "blue clothes", for example, there are various blue colors such as light blue, navy, and indigo, and determining in what range of colors to be blue color depends on the range of blue colors preset by system design. Users, however, cannot know information on the system design, therefore, they need to repeat trial and error for the right text representation of the search query until finding an intended image.

The same applies to another text representation of a scale of length, size and other measurements, such as length of hair, size of a bag, body shape, and pattern of clothes. Considering receipt of a search query "a long-haired woman", for example, the definition of long hair depends on an existing system design.

In addition, erroneous recognition may occur in analyzing clothes, accessories, and other pieces of clothing. At the time of failure of retrieving an intended image, users cannot determine the cause of the failure, i.e., whether it is due to the text representation of the search query or due to erroneous recognition.

Further, users cannot change the range of retrievable images by a text query, thus, they need to visually check all of a large number of candidates within the range, which is inefficient.

An object of the present invention is to provide a retrieval device, a retrieval method, and a computer program product that can facilitate evaluation of the retrieval accuracy of the retrieval device.

DETAILED DESCRIPTION

According to one embodiment, generally, a retrieval device includes one or more processors configured to retrieve a plurality of search image regions from an intended image through image search using a search query, extract a plurality of learning image regions from a learning image used in learning of the image search, through the image search using the search query, and display the search image regions and the learning image regions on a display.

Exemplary embodiments of a retrieval device, a retrieval method, and a computer program product will be described in detail below with reference to the accompanying drawings.

First Embodiment

First, an exemplary functional configuration of a retrieval device 100 according to a first embodiment is described.

Exemplary Functional Configuration

Figure 1:
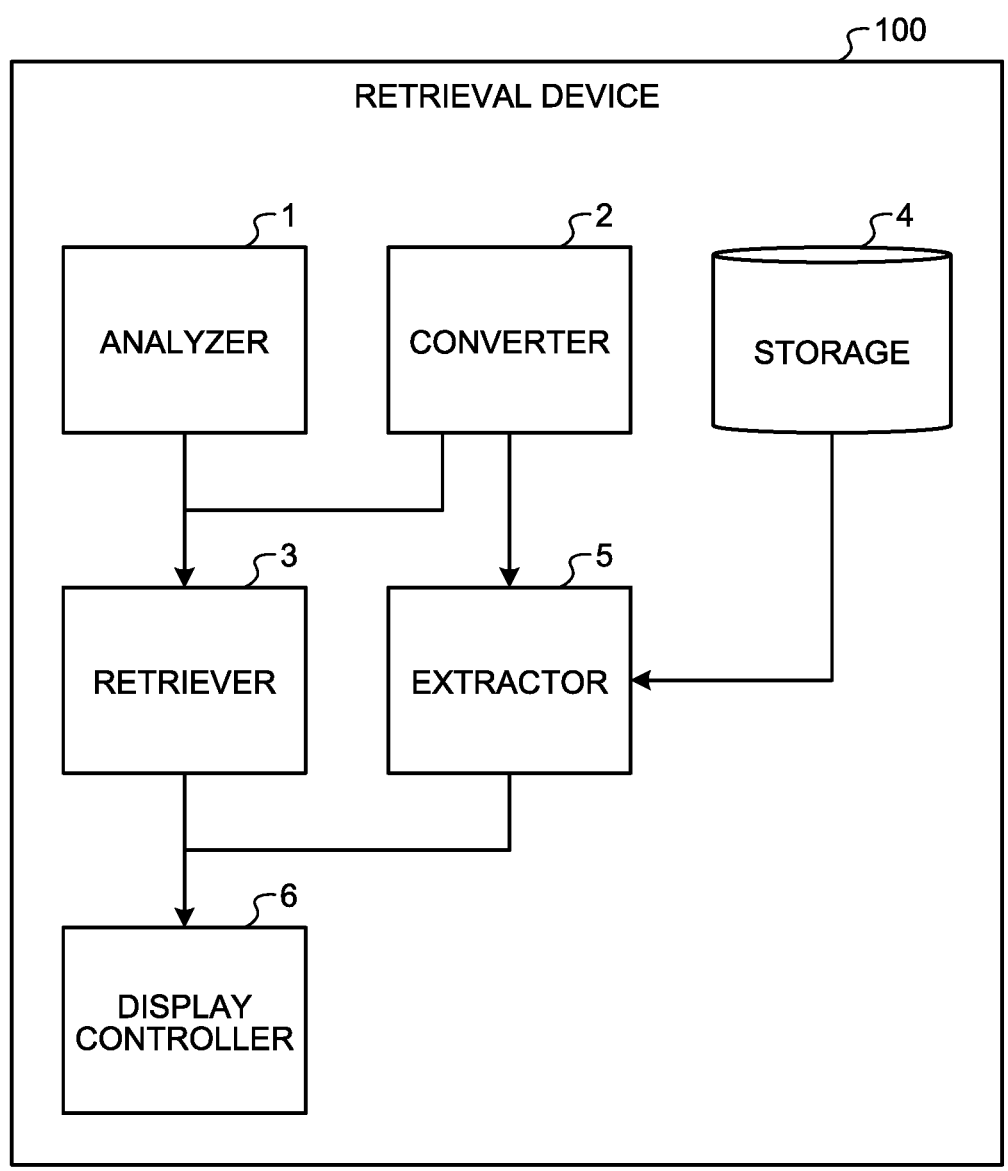
FIG. 1 is a diagram of an exemplary functional configuration of a retrieval device according to a first embodiment.

FIG. 1 is a diagram of an exemplary functional configuration of the retrieval device 100 according to the first embodiment. The retrieval device 100 according to the first embodiment includes an analyzer 1, a converter 2, a retriever 3, a storage 4, an extractor 5, and a display controller 6.

The analyzer 1 receives an image to retrieve. The image to retrieve may be arbitrary. The image to retrieve is an image or video generated by a plurality of monitoring cameras installed in a large-scale facility, for example. When receiving an image to retrieve, the analyzer 1 analyzes a first region attribute indicating an attribute of an image region of the image to retrieve. The attribute of an image region includes at least one of name, color, pattern, shape, length, size, age, and gender, for example. An image region showing a person wearing a blue shirt, for example, has the attributes of "blue" and "shirt".

To analyze the attribute such as "shirt", the analyzer 1 needs to detect a person wearing a shirt from the image to retrieve. To detect a person, the detection method disclosed in "T. Watanabe, et al.: Co-occurrence histograms of oriented gradients for pedestrian detection, 2009" can be used, for example. To analyze an attribute, the analysis method disclosed in "Y. Lin, et al.: Improving Person Re-identification by Attribute and Identity Learning, 2017" can be used, for example.

The analyzer 1 may analyze behavior of a person from time-series image data, in addition to the first region attribute. To analyze behavior, the analysis method disclosed in "J. C. Niebles, et al.: Unsupervised learning of human action categories using spatial-temporal words, 2008" can be used, for example.

The analyzer 1 outputs, as metadata of the image to retrieve, analyzed information, a camera number for identifying a camera that has generated the image, and imaging time at which the image has been generated, for example.

The converter 2 converts a search query into one or more search attributes. The search query includes text for identifying an intended subject, for example. The subject may be arbitrary. The subject is a person or a vehicle, for example. In the case of identifying a person by a search query, for example, text serves to identify gender, age group, and name (kind), color, and pattern of clothes and accessories. Specifically, the search query represents "blue shirt", for example.

The search attribute includes at least one of name, color, pattern, shape, length, size, age, gender, and behavior, for example. The following describes an exemplary method for converting a search query into search attributes.

Upon receipt of a search query, the converter 2 performs morphological text analysis of the search query, using MeCab library, for example. The converter 2 converts morphemes into attributes, for example, referring to a table containing the relationship between character strings of morphemes and attributes. The search query "blue shirt" is divided into morphemes of blue and shirt, for example. The noun, "shirt" is converted into an attribute, Upper Clothes and the adjective "blue" is converted into an attribute, Blue. The converter 2 then analyzes modification or dependency of the search query to determine that the type of the attribute is Upper Clothes and that the color is Blue. Through such operation, the search query "blue shirt" is converted into two search attributes, Upper Clothes and Blue.

The retriever 3 retrieves a plurality of search image regions from the intended image through image search using the search query. Specifically, the retriever 3 retrieves image regions including the first region attribute with similarity equal to or higher than a threshold with respect to the search attribute, as image regions to retrieve. The retriever 3 sorts the retrieved image regions in descending order of the similarity.

Similarity evaluation method may be an arbitrary method. The similarity may be a recognition score of the first region attribute indicating the attribute of an image region, for example. The recognition score indicates the likelihood of the first region attribute associated with the image region. If the search attribute is Upper Clothes, for example, the image region having a higher recognition score of Upper Clothes is determined to have higher similarity among the image regions associated with the first region attribute, Upper Clothes. If multiple first region attributes of the search image region are designated, the similarity is determined on basis of the average of the recognition scores of the attributes.

The storage 4 stores therein a learning image and a second region attribute indicating an attribute of an image region of the learning image. The learning image refers to an image used for the retriever 3 to learn the image search. The likelihood of the second region attribute is higher than that of the first region attribute, that is, the second region attribute is more accurate than the first region attribute. This is because, when receiving an image unexpected in the image search learning, for example, the analyzer 1 may associate an inappropriate first region attribute with the image region of the image to retrieve. If a display image group having a more accurate attribute value than the first region attribute is separately provided, the retrieval device 100 may use the image group and the attribute value of the image group instead of the learning image and the second region attribute.

The storage form of the learning image and the second region attribute in the storage 4 may be arbitrary. The second region attribute may be a label value associated with the image region of the learning image through the learning of image recognition of the learning image, for example. Specifically, the image region of the learning image may be manually labelled with correct solution of each attribute, for example. The label value may be not a discrete value indicating presence (correctness) or absence (incorrectness) but a continuous value. Length of hair, for example, may be expressed by real numbers from 0 to 1 where 0 represents short hair, and 1 represents long hair. In this case, the analyzer 1 analyzes the image using a model resulting from learning of output regression based on the labels of continuous values. In the case of applying the label value indicating color to the image region, the analyzer 1 may use a model resulting from learning of luminance, saturation, and hue, for example.

The storage 4 may store therein all the learning images used in the learning or randomly selected (reduced in number) learning images. Alternatively, the retrieval device 100 may store, in the storage 4, only the representative value of clusters resulting from clustering, to express the range of learning images in a smaller number of images.

The extractor 5 extracts a plurality of learning image regions from the learning image used in the learning of the image search, through the image search using the search query. The extractor 5 sorts the extracted learning image regions in descending order of similarity.

Specifically, the extractor 5 extracts a plurality of learning image regions in descending order of similarity according to the similarity between the search attribute converted from the search query and the second region attribute (e.g., label) associated with the learning image region. If the label is a continuous value, the extractor 5 may sort the extracted learning image regions in accordance with the continuous value. If there are two or more search attributes converted from the search query, the extractor 5 may extract the learning image regions corresponding to the search attributes or the learning image regions including all the search attributes.

Specifically, if the search attribute includes designation of blue color, for example, the extractor 5 extracts two or more learning image regions labeled with the second region attributes, such as light blue, navy, and purple, and sorts the learning image regions in descending order of the similarity to the search attributes.

The display controller 6 displays display information including the search image regions and the learning image regions on a display such as a liquid crystal display. Specifically, for example, the display controller 6 displays display information containing a display section for learning image regions (search-reference selection) and a display section for search results on the display. The learning-image-region display section displays the learning image regions in descending order of the similarity to receive selection of a search reference from the learning image regions. The search-result display section displays the search image regions in descending order of the similarity.

Exemplary Display Information

Figure 2:
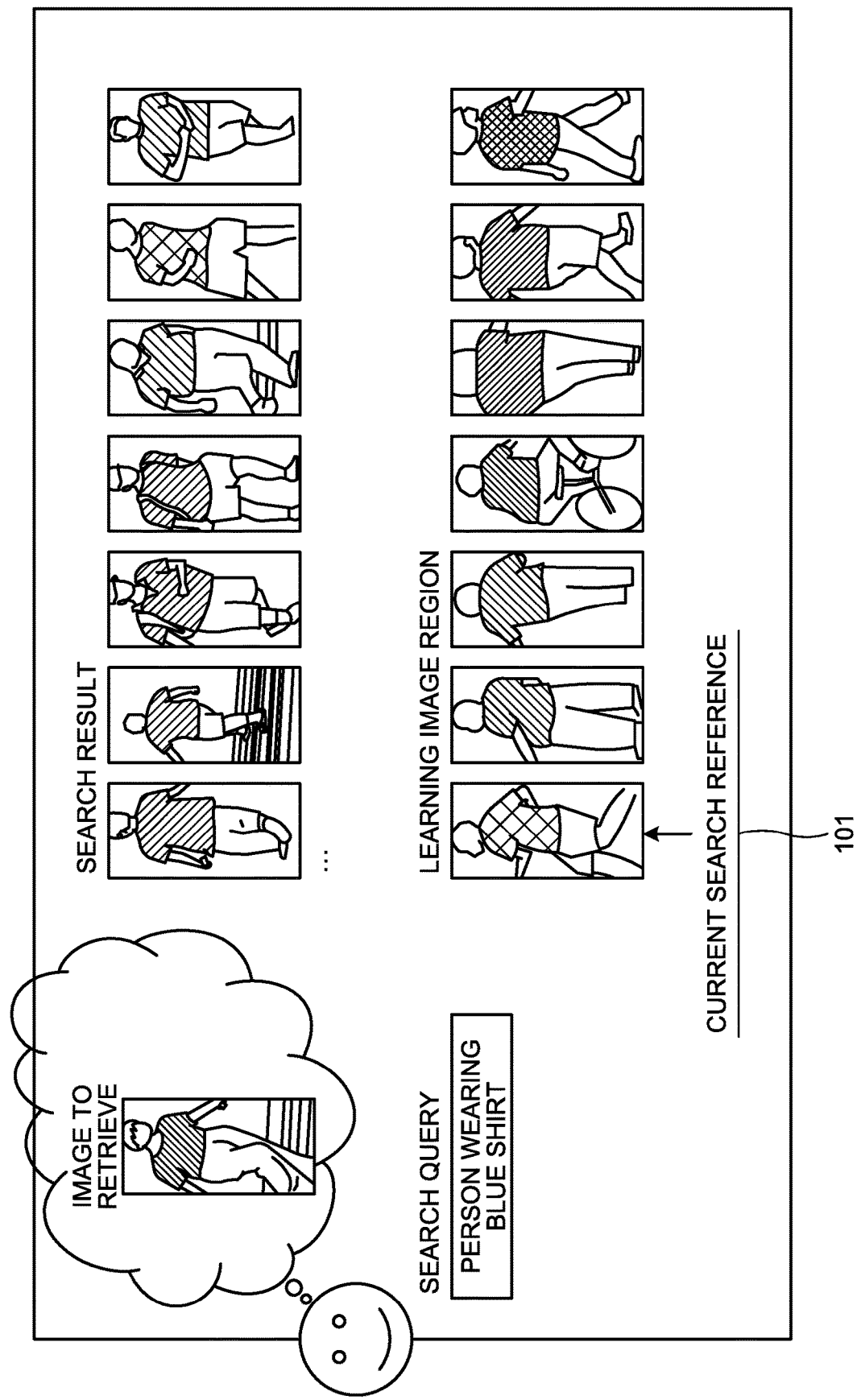
FIG. 2 is a diagram of a first example of display information according to the first embodiment.

FIG. 2 is a diagram of a first example of the display information according to the first embodiment. In the example illustrated in FIG. 2, the display information includes the search-result display section (top row in FIG. 2) and the learning-image-region display section (bottom row in FIG. 2). The search-result display section displays multiple search image regions in descending order of similarity. The learning-image-region display section displays multiple learning image regions in descending order of similarity.

The displayed images in the search-result display section (top row in FIG. 2) and the learning-image-region display section (bottom row in FIG. 2) may be still images or moving images. If the search attribute includes behavior, for example, the display controller 6 displays search results in the form of moving images.

In the example illustrated in FIG. 2, the more leftward displayed in the search-result display section the search image regions are, the higher similarity the search image regions exhibit. Likewise, the more leftward displayed in the learning-image-region display section the learning image regions are, the higher similarity the learning image regions exhibit. In the leftmost learning image region displayed in the learning-image-region display section, a display 101 showing the current search (recognition) reference is displayed.

FIG. 2 illustrates the example that the user intends to retrieve a person wearing a shirt of blue color closer to navy, using the query "blue shirt", resulting in failure of finding his or her intended image, retrieving only blue shirts with high saturation.

By contrast, the learning-image-region display section includes the learning image regions showing from blue shirts with high saturation (light-blue shirts) to blue shirts with low saturation (navy shirts). Such a display enables the user to see searchability of blue shirts with high saturation to low saturation. As a result, the user can understand that the search query "blue shirt" is valid. This makes it possible for the user to determine erroneous recognition of images to retrieve if the search results show no intended images even in the lower rank (refer to a second example of the display information illustrated in FIG. 3, for example).

Figure 3:
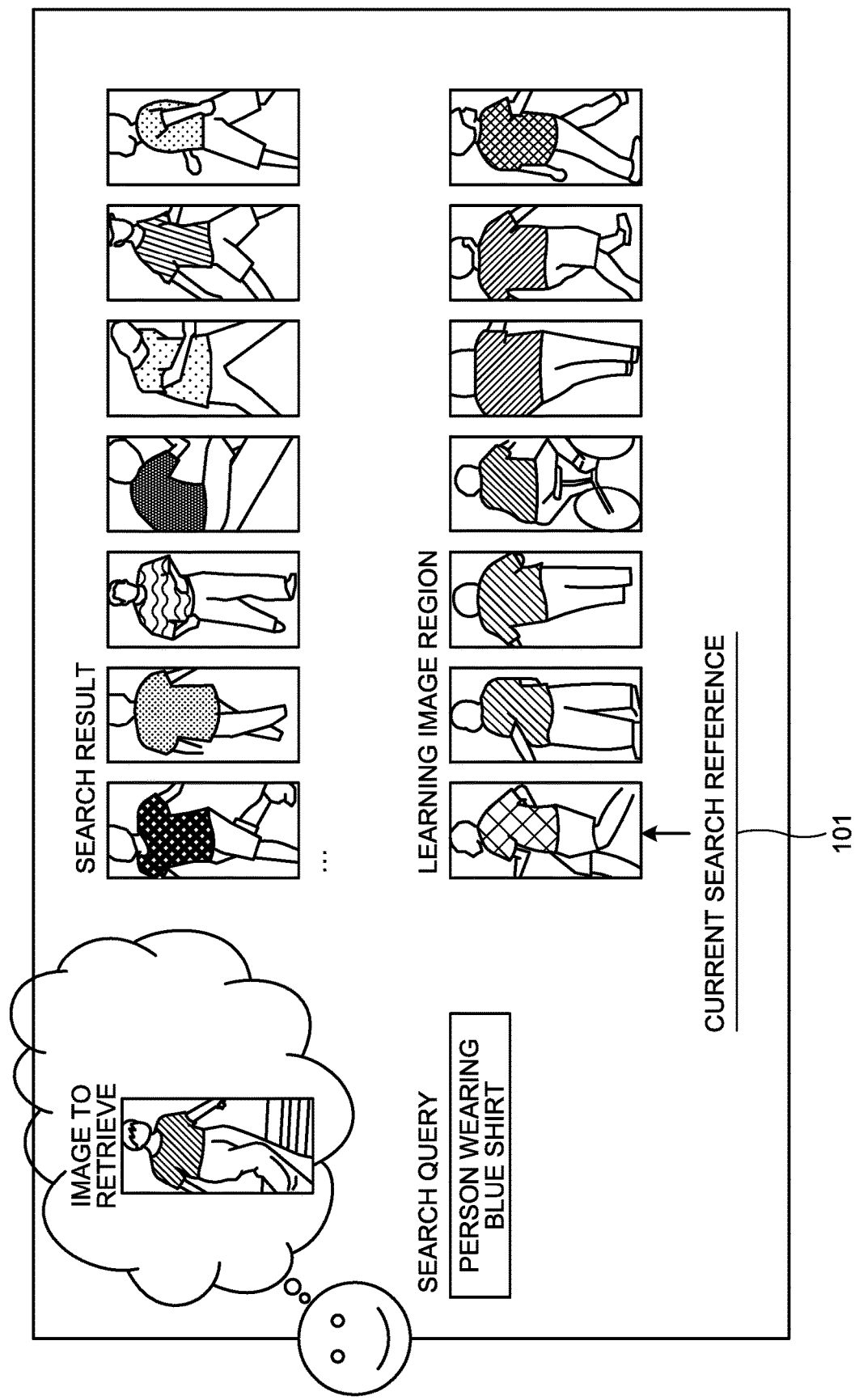
FIG. 3 is a diagram of a second example of the display information according to the first embodiment.

FIG. 3 is a diagram of the second example of the display information according to the first embodiment. In the example illustrated in FIG. 3, the learning-image-region display section (bottom row in FIG. 3) shows the learning image regions similar to the user's intended image to retrieve while the search-result display section (top row in FIG. 3) shows no search result similar to the user's intended image to retrieve. Such a display enables the user to determine that the cause of failure in finding the intended image through the search may be not the textual representation of the search query but erroneous recognition of the image to retrieve.

The search query can be flexibly designated, so that the images to retrieve can be various images. Depending on the manner of designating the search query, the search having been normally conducted on the learning images may fail to normally work on images to retrieve generated under an actual operation environment (e.g., monitoring camera). The retrieval device 100 according to the first embodiment displays the display information as illustrated in FIG. 3, thereby facilitating the evaluation of the retrieval accuracy of the retrieval device 100.

With multiple search queries available, the retrieval device 100 may display multiple learning-image-region display sections corresponding to the search queries, for example. When the extractor 5 extracts learning image regions on the basis of the search attribute resulting from integrated search queries, for example, the retrieval device 100 may display the learning image regions.

If the learning image regions are sorted according to the similarity based on the recognition score, the search image regions as the search results are output on the basis of the same search (recognition) reference. Thus, the learning image region having the highest label value of similarity may be provided with the display 101, such as a system recognition reference and a system search reference.

When the extractor 5 outputs multiple learning image regions, the display controller 6 displays all the learning image regions. Specifically, the display controller 6 displays the attribute names associated with the learning image regions as captions and the learning image regions near the captions (refer to a third example of the display information illustrated in FIG. 4, for example).

Figure 4:
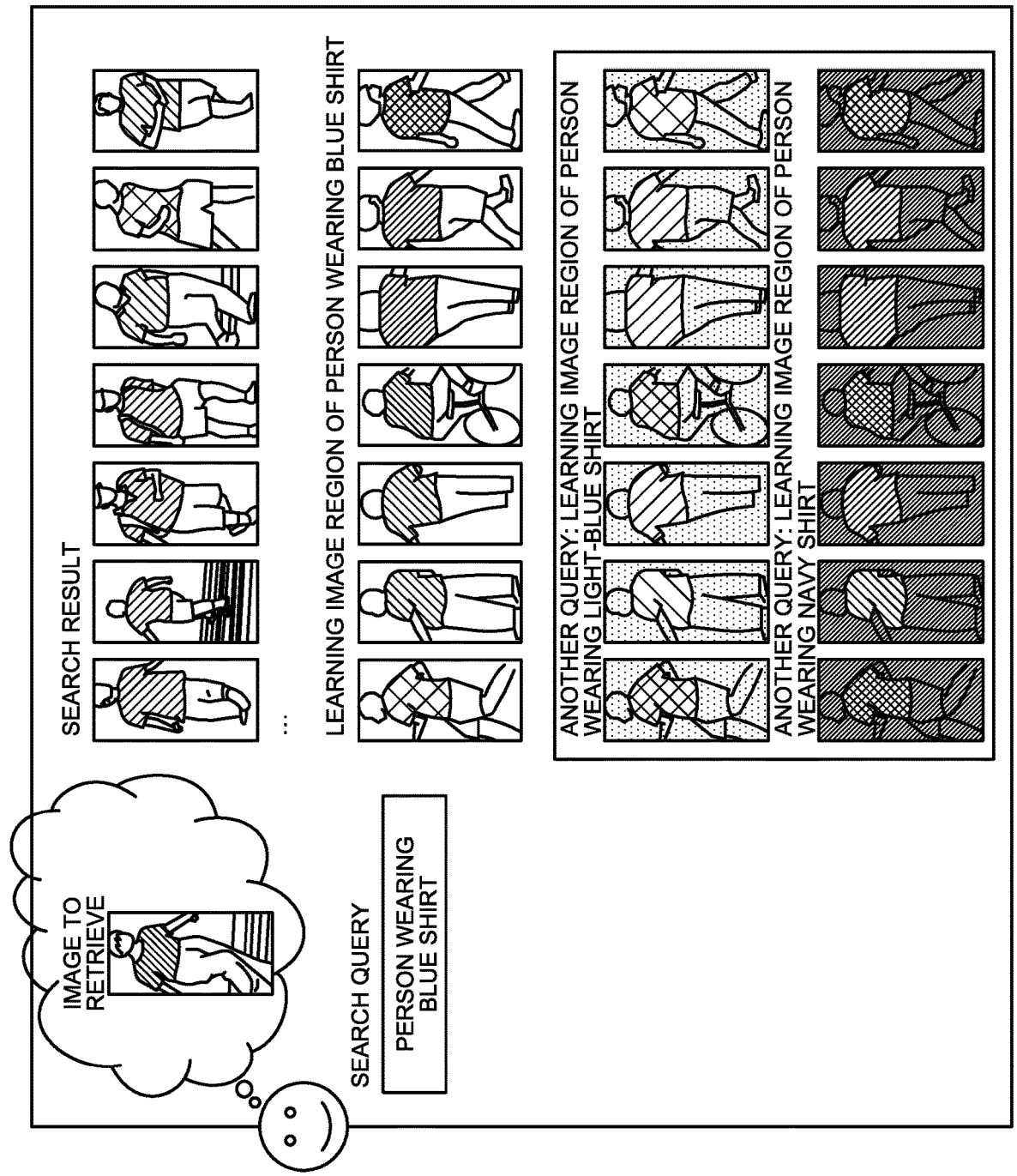
FIG. 4 is a diagram of a third example of the display information according to the first embodiment.

FIG. 4 is a diagram of the third example of the display information according to the first embodiment. FIG. 4 illustrates the example of displaying the learning image regions corresponding to other queries (a person wearing a light-blue shirt and a person wearing a navy shirt) similar to the search query being a person wearing a blue shirt, in addition to the learning image regions corresponding to the search query. By display of the display information as illustrated in FIG. 4, the retrieval device 100 can help the user select the search query when no learning image region similar to the intended image is displayed by the designated search query.

The display controller 6 may display the learning image regions not directly but as icons. The display controller 6, for example, may convert a learning image region into an icon image corresponding to the second region attribute of the learning image region. The display controller 6 may display the search-reference selection section including the icon image instead of the learning image region on the display. Specifically, the icon image is associated with the attribute value. In terms of color, for example, the display controller 6 superimposes color on the icon image for display. In terms of the length of hair, for example, the display controller 6 may display a hair part of the icon image in different lengths.

As described above, in the retrieval device 100 according to the first embodiment, the retriever 3 retrieves multiple search image regions from an image to retrieve. The extractor 5 extracts learning image regions from the learning image used in the learning of the image search, through the image search using the search query. The display controller 6 displays the search image regions and the learning image regions on the display. Thereby, the retrieval device 100 according to the first embodiment can facilitate the evaluation of the retrieval accuracy of the retrieval device 100. The retrieval device 100 can show the user the search (recognition) reference corresponding to the search query, for example, which allows the user to understand the validity of the search query (e.g., whether the input query matches an intended person to retrieve). Consequently, when failing to retrieve the intended image, the user can determine whether the search query needs to be corrected or the failure is due to erroneous recognition.

Second Embodiment

The following describes a second embodiment. In the second embodiment, the differences from the first embodiment are described and description similar to the first embodiment is omitted.

Exemplary Functional Configuration

Figure 5:
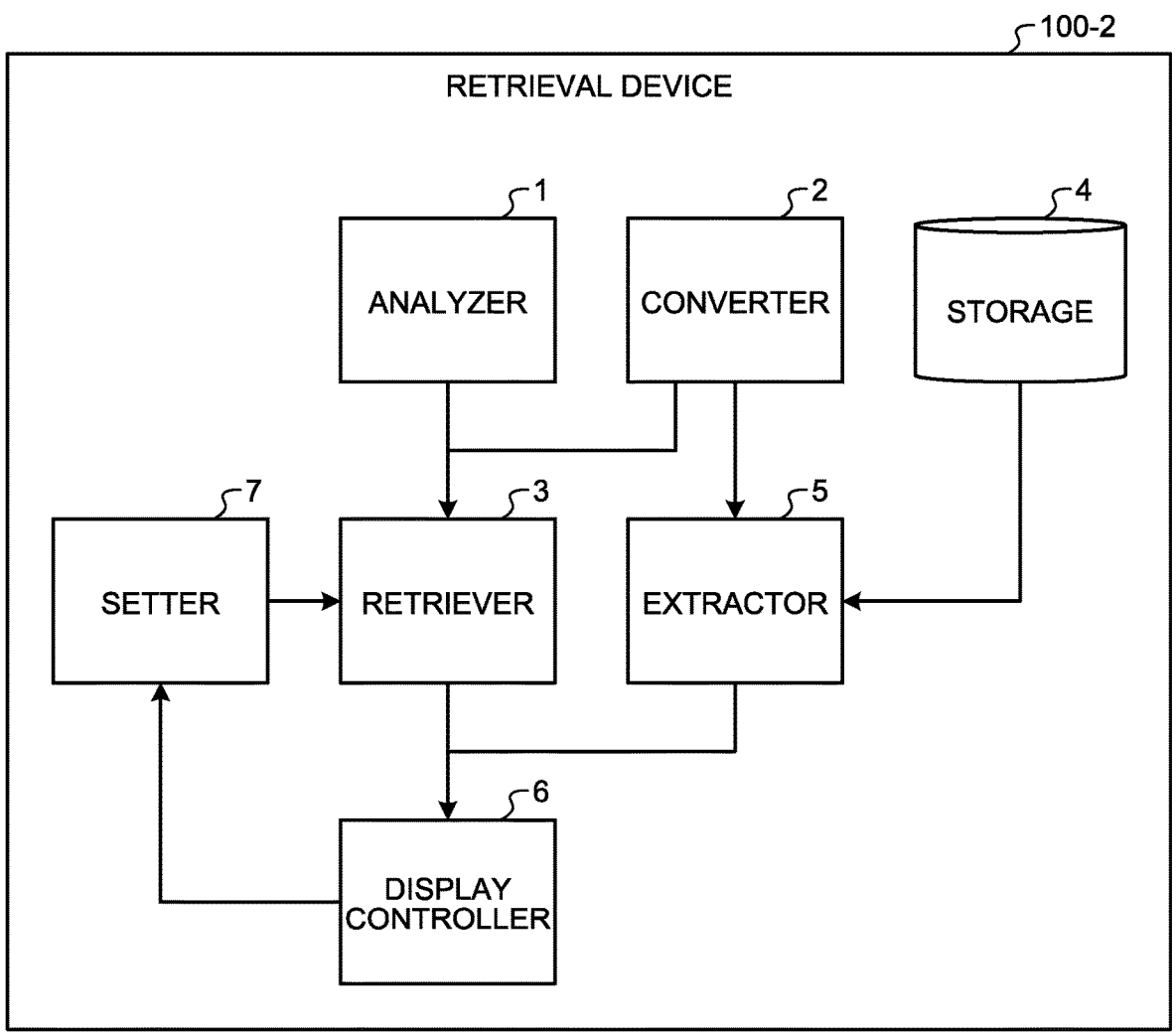
FIG. 5 is a diagram of an exemplary functional configuration of the retrieval device according to a second embodiment.

FIG. 5 is a diagram of an exemplary functional configuration of a retrieval device 100-2 according to the second embodiment. The retrieval device 100-2 according to the second embodiment includes an analyzer 1, a converter 2, a retriever 3, a storage 4, an extractor 5, a display controller 6, and a setter 7. The analyzer 1, the converter 2, the storage 4, and the extractor 5 according to the second embodiment are the same as those according to the first embodiment.

The setter 7 receives selection of a displayed learning image region and sets the second region attribute of the selected learning image region as the search reference for the search attribute used in the extraction of the selected learning image region. This enables the user to select a learning image region similar to his or her intended person to retrieve from different learning image regions on display, for example, to change the search reference and perform a search again using the changed search reference.

The retriever 3 retrieves the image using the search attribute for which the search reference is set. Specifically, the retriever 3 retrieves, as search image regions, image regions including the first region attribute having similarity equal to or higher than the threshold with respect to the second region attribute set as the search reference.

In more detail, the setter 7 inputs, to the retriever 3, the label value of the learning image region extracted based on the search query, as the set search reference by the user's selection of the learning image region.

When the learning image region is given the label value being a continuous value, the retriever 3 defines the label value of the selected learning image region as the origin and the closeness to the origin as similarity. The retriever 3 sorts and outputs the search image regions according to the similarity.

The display controller 6 displays the results retrieved again by the retriever 3 on the display. The display controller 6 displays a display 101 showing the current search (recognition) reference of the retrieval device 100-2 near the selected learning image region (refer to FIG. 6).

Exemplary Display Information

Figure 6:
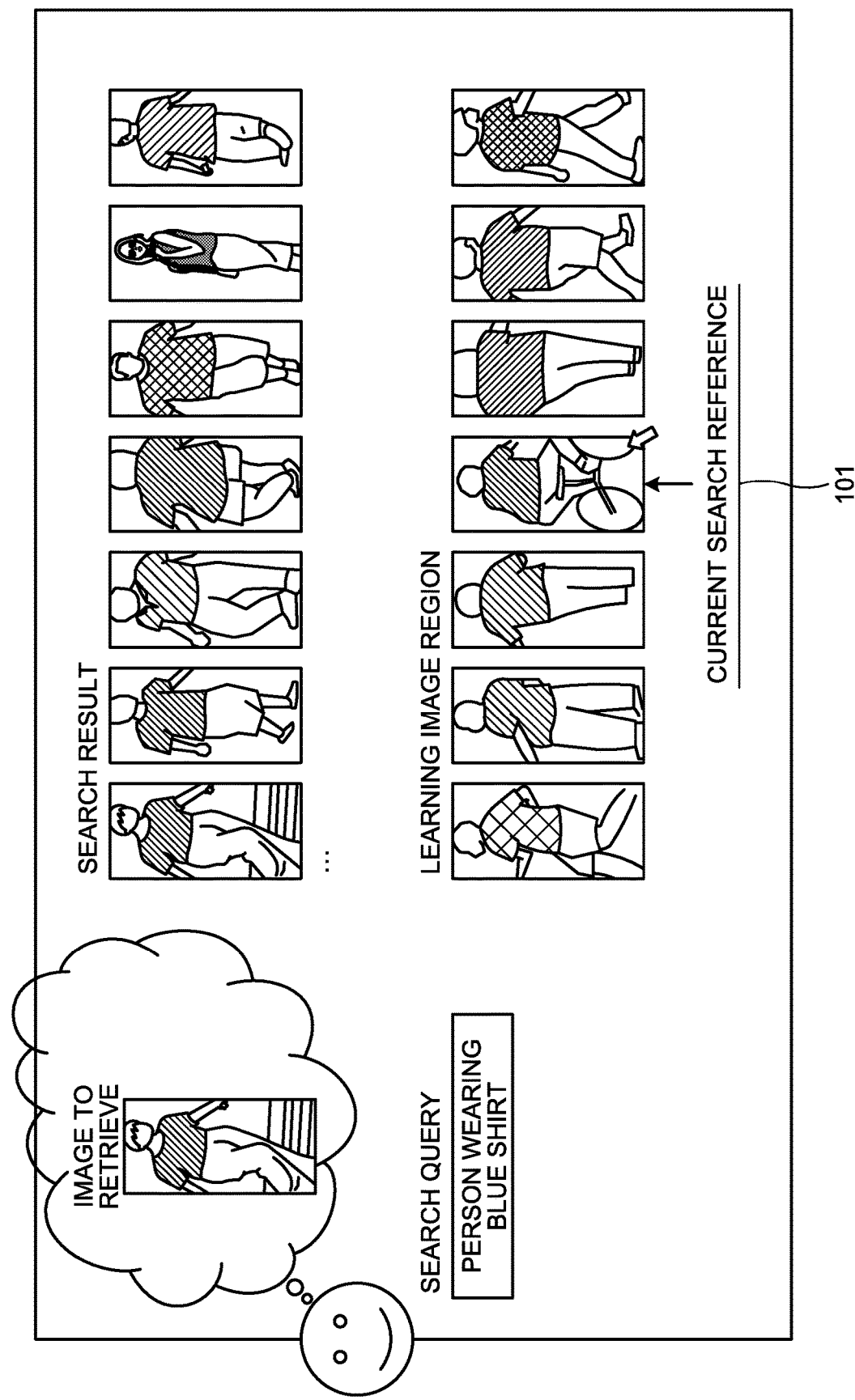
FIG. 6 is a diagram of a first example of the display information according to the second embodiment.

FIG. 6 is a diagram of a first example of the display information according to the second embodiment. FIG. 6 illustrates the example that the fourth learning image region from the left, selected with an input device (e.g., a mouse), displays the display 101 showing the current search (recognition) reference of the retrieval device 100-2. FIG. 6 shows the example of obtaining an intended search result by selecting the fourth learning image region from the left as the search reference.

The display controller 6 need not simultaneously display the search results in the top row and the learning image regions in the bottom row. The display controller 6, for example, may display the search-result display section on the display and then display the search-reference selection section on the display after elapse of a certain period of time. Alternatively, the display controller 6 may display exemplary learning image regions before displaying the search results, allowing the user to select the search reference, and then display the results of a search using the search reference. Further, the display controller 6, for example, may display only the search results and then display new learning image regions in accordance with the amount of scrolling for switching display of search candidates in the search results.

Figure 7:
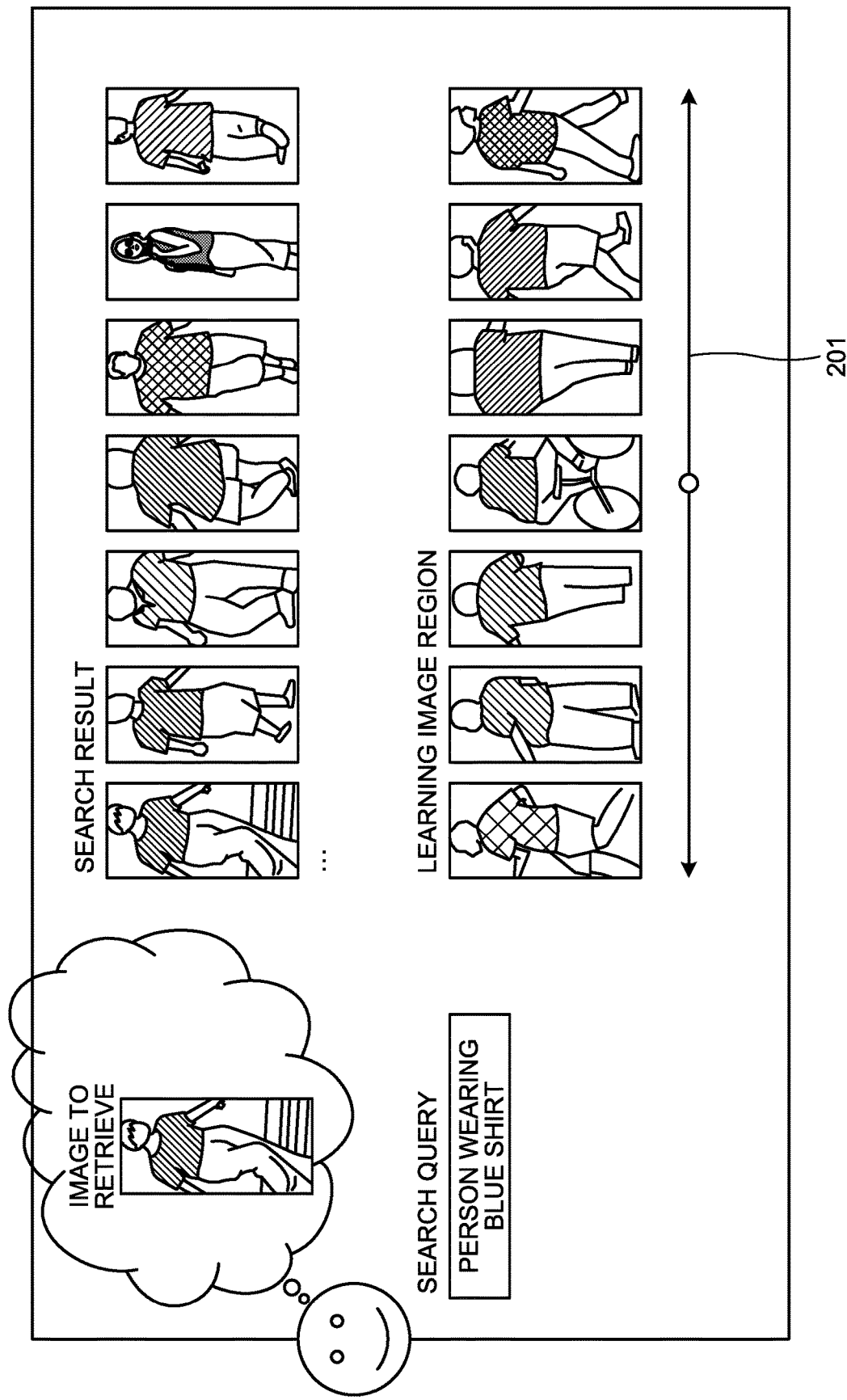
FIG. 7 is a diagram of a second example of the display information according to the second embodiment.

The display controller 6 may receive selection of the search reference with a slide bar 201 (refer to FIG. 7).

FIG. 7 is a diagram of a second example of the display information according to the second embodiment. FIG. 7 illustrates the example of displaying the learning image regions in the order of sort based on the attribute value (e.g., a continuous value indicating the brightness of blue). FIG. 7 shows the slide bar 201 under the learning image regions, by way of example. In response to the motion of the slide bar 201 to select the search reference, the retriever 3 retrieves the learning image regions again using the search reference, and displays the search results. In the example illustrated in FIG. 7, the fourth learning image region from the left is selected as the search reference to be able to obtain an intended search result.

As described above, the retrieval device 100-2 according to the second embodiment can select a learning image region similar to an intended image and set the search reference of the learning image region again. As a result, the user can retrieve the intended image without changing the search query through trial and error. When the learning-image-region display section includes a learning image region similar to the intended image but the search results include no intended image, the user can understand that erroneous recognition of the image to retrieve has occurred. Furthermore, the user can set the search reference similar to the intended image with the slide bar 201 and find the intended image in higher retrieval rank based on the set search reference, which can shorten the time taken for visually checking the search candidates in the search results.

Third Embodiment

The following describes a third embodiment. In the third embodiment, the differences from the first embodiment are described and description similar to the first embodiment is omitted.

Exemplary Functional Configuration

Figure 8:
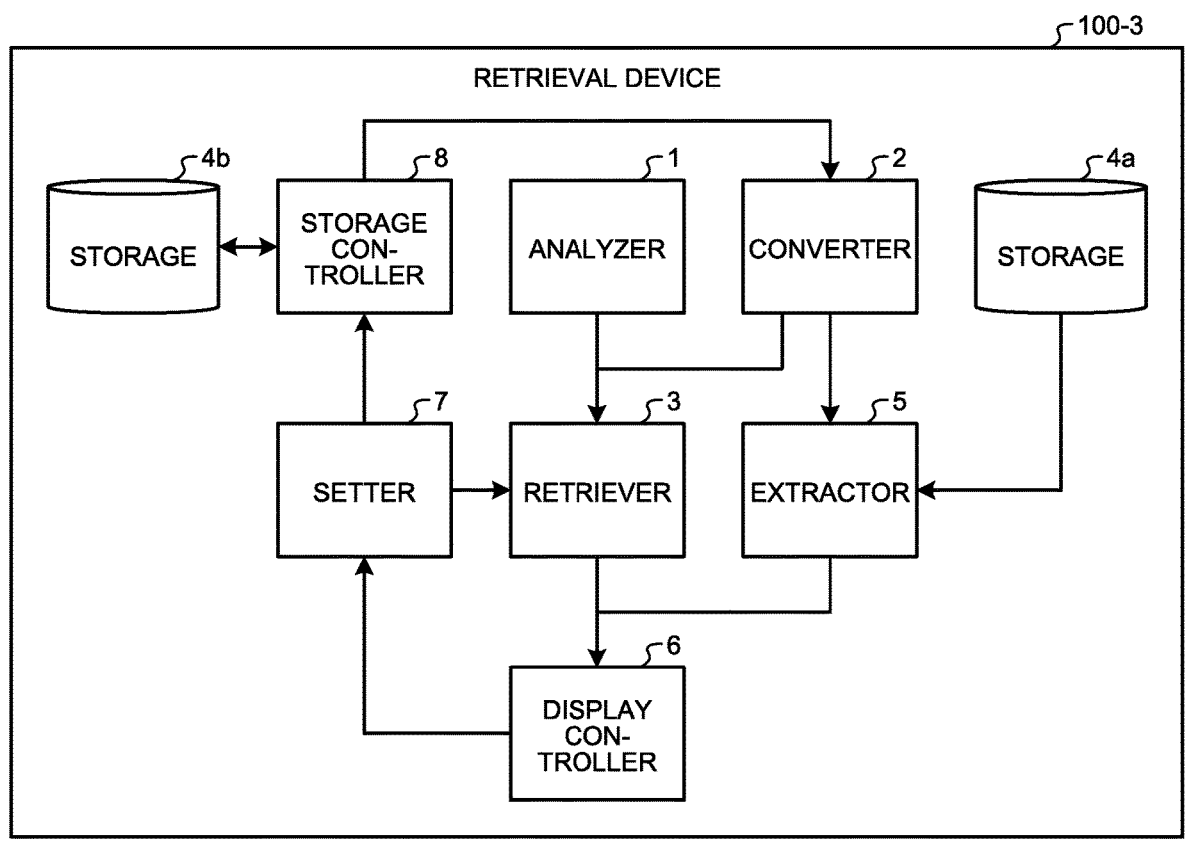
FIG. 8 is a diagram of an exemplary functional configuration of the retrieval device according to a third embodiment.

FIG. 8 is a diagram of an exemplary functional configuration of a retrieval device 100-3 according to the third embodiment. The retrieval device 100-3 according to the third embodiment includes an analyzer 1, a converter 2, a retriever 3, a storage 4a, an extractor 5, a display controller 6, a setter 7, a storage controller 8, and a storage 4b. The analyzer 1, the retriever 3, the extractor 5, the display controller 6, and the setter 7 according to the third embodiment are the same as those according to the second embodiment. The storage 4a according to the third embodiment is the same as the storage 4 according to the second embodiment. The storages 4a and 4b may be provided as the same hardware or different items of hardware.

The storage controller 8 stores, in the storage 4b, the search attribute (e.g., Blue) for which the search reference is set and the second region attribute (e.g., a label value indicating blue) set as the search reference in association with each other. The storage controller 8 check whether the search attribute converted by the converter 2 has the search reference set, referring to the storage 4b.

With the search reference set for the search attribute converted by the converter 2, the retriever 3 retrieves image regions having the first region attribute with similarity equal to or higher than the threshold with respect to the second region attribute being the search reference, as the search image regions.

The retriever 3 and the storage controller 8 according to the third embodiment issue a new query name (e.g., Blue2) for the set search reference, enabling a search based on the search reference, upon receipt of the same query again. Specifically, the storage 4b contains a conversion table for converting the new query name into the search attribute for which the search reference is set, for example. The storage controller 8 stores, in the conversion table, newly issued query names, search attributes, and the search reference in association with one another. If the search attribute (Blue) converted from the search query is similar to or coincides with the query name (Blue2) stored in the conversion table, the converter 2 converts the search attribute into the search attribute for which the search reference is set, using the newly issued query.

As described above, the retrieval device 100-3 according to the third embodiment enables the user to store the query of the previously set search reference with another name and reuse the query. Thereby, the search usability of the retrieval device 100-3 can be improved.

Fourth Embodiment

The following describes a fourth embodiment. In the fourth embodiment, the differences from the first embodiment are described and description similar to the first embodiment is omitted.

Exemplary Functional Configuration

Figure 9:
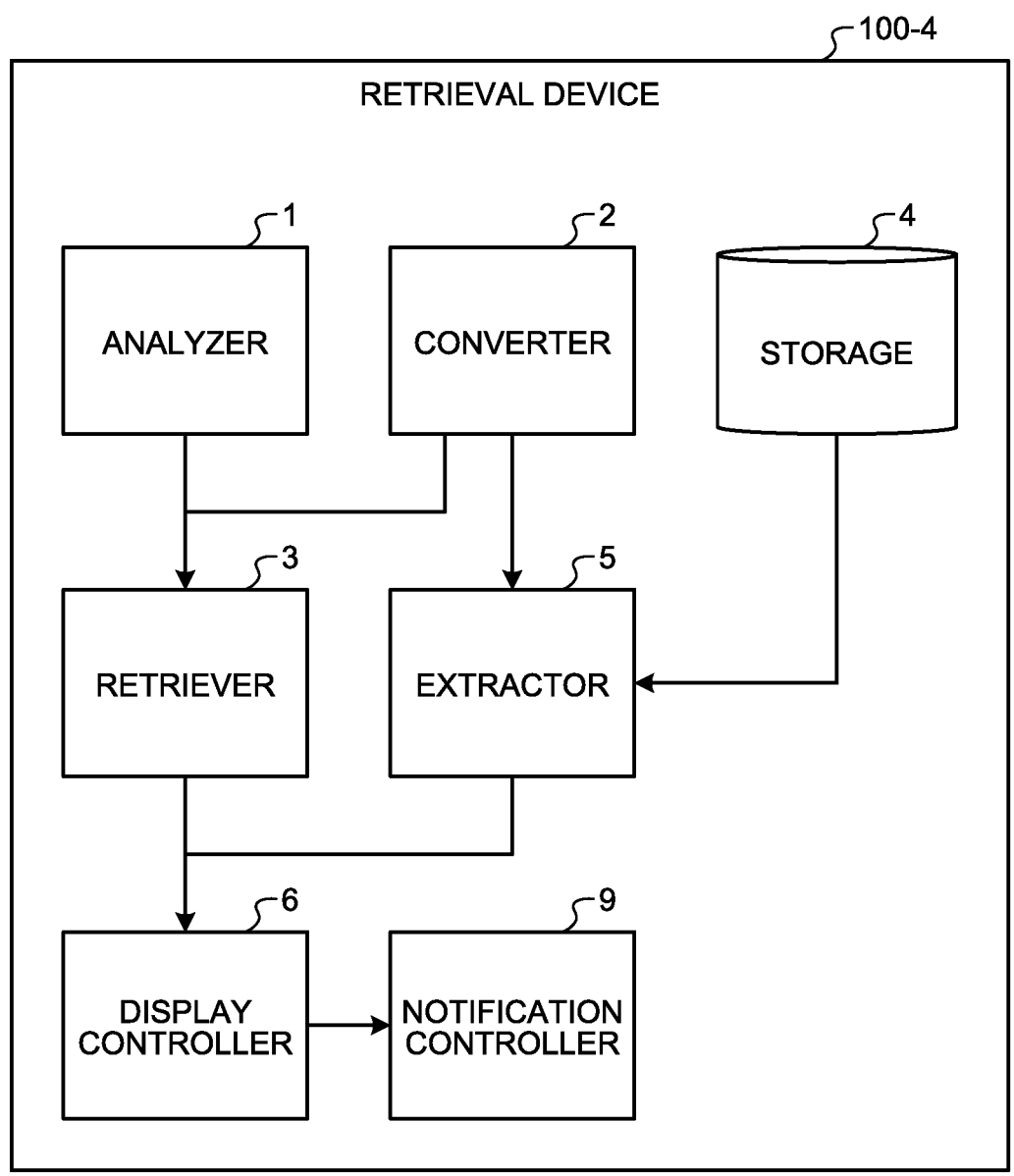
FIG. 9 is a diagram of an exemplary functional configuration of the retrieval device according to a fourth embodiment.

FIG. 9 is a diagram of an exemplary functional configuration of a retrieval device 100-4 according to the fourth embodiment. The retrieval device 100-4 according to the fourth embodiment includes an analyzer 1, a converter 2, a retriever 3, a storage 4, an extractor 5, a display controller 6, and a notification controller 9. The analyzer 1, the retriever 3, the storage 4, and the extractor 5 according to the fourth embodiment are the same as those according to the first embodiment.

The notification controller 9 issues a notification of an anomaly in the retrieval device 100-4. When the user determines that erroneous recognition has occurred, for example, the notification controller 9 notifies an administrator of the retrieval device 100-4 of the anomaly, in response to a user's operation input.

Exemplary Display Information

Figure 10:
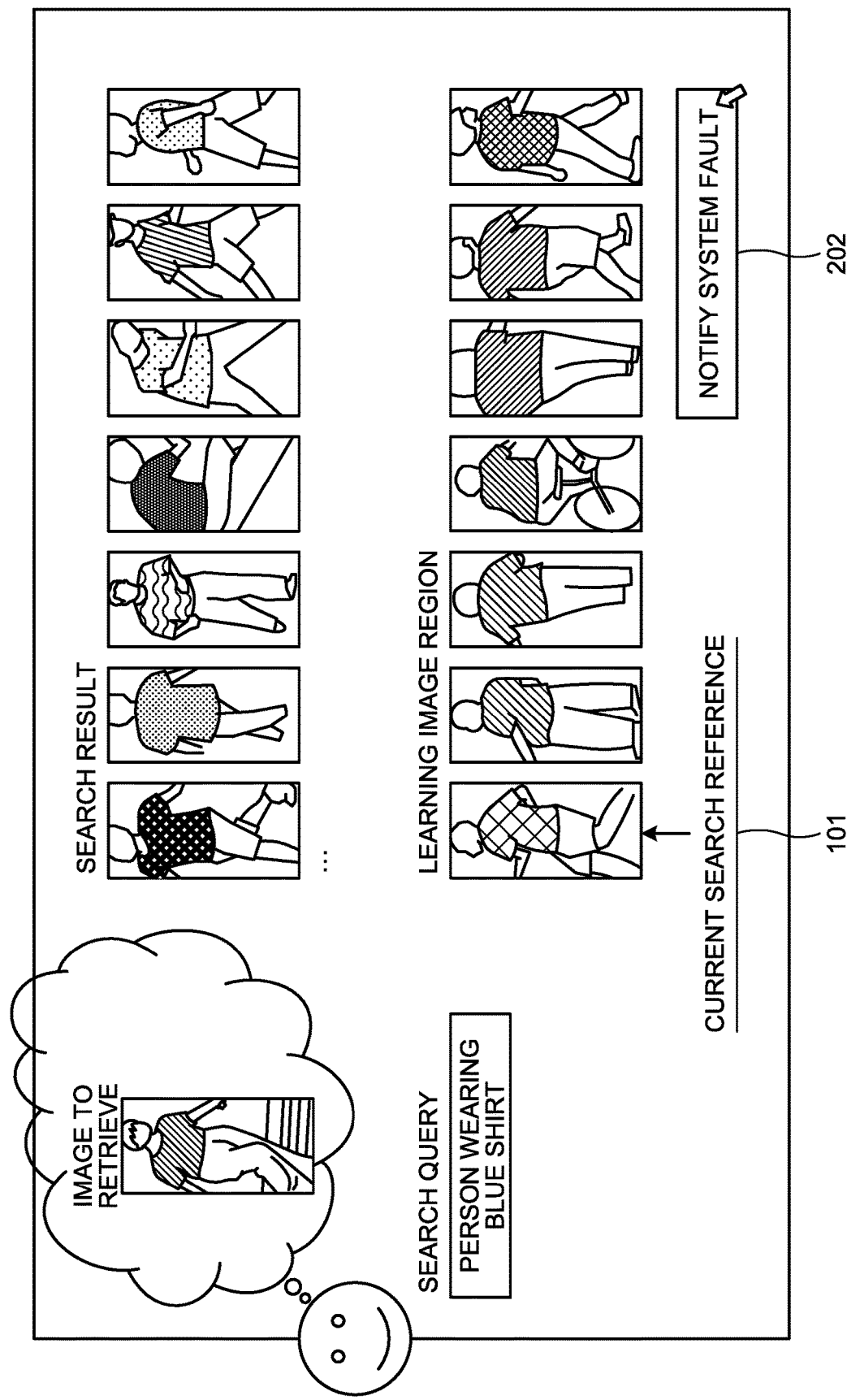
FIG. 10 is a diagram of a first example of the display information according to the fourth embodiment.

FIG. 10 is a diagram of a first example of the display information according to the fourth embodiment. FIG. 10 illustrates the example of adding an anomaly notification button 202 that receives an operation input from the user. In the example illustrated in FIG. 10, while the learning-image-region display section (bottom row in FIG. 10) includes the learning image regions similar to the intended image, the search-result display section (top row in FIG. 10) includes no intended image. When the user determines occurrence of erroneous recognition during the search of the intended image and presses the anomaly notification button 202, the notification controller 9 notifies the administrator of the retrieval device 100-4 of the anomaly.

Figure 11:
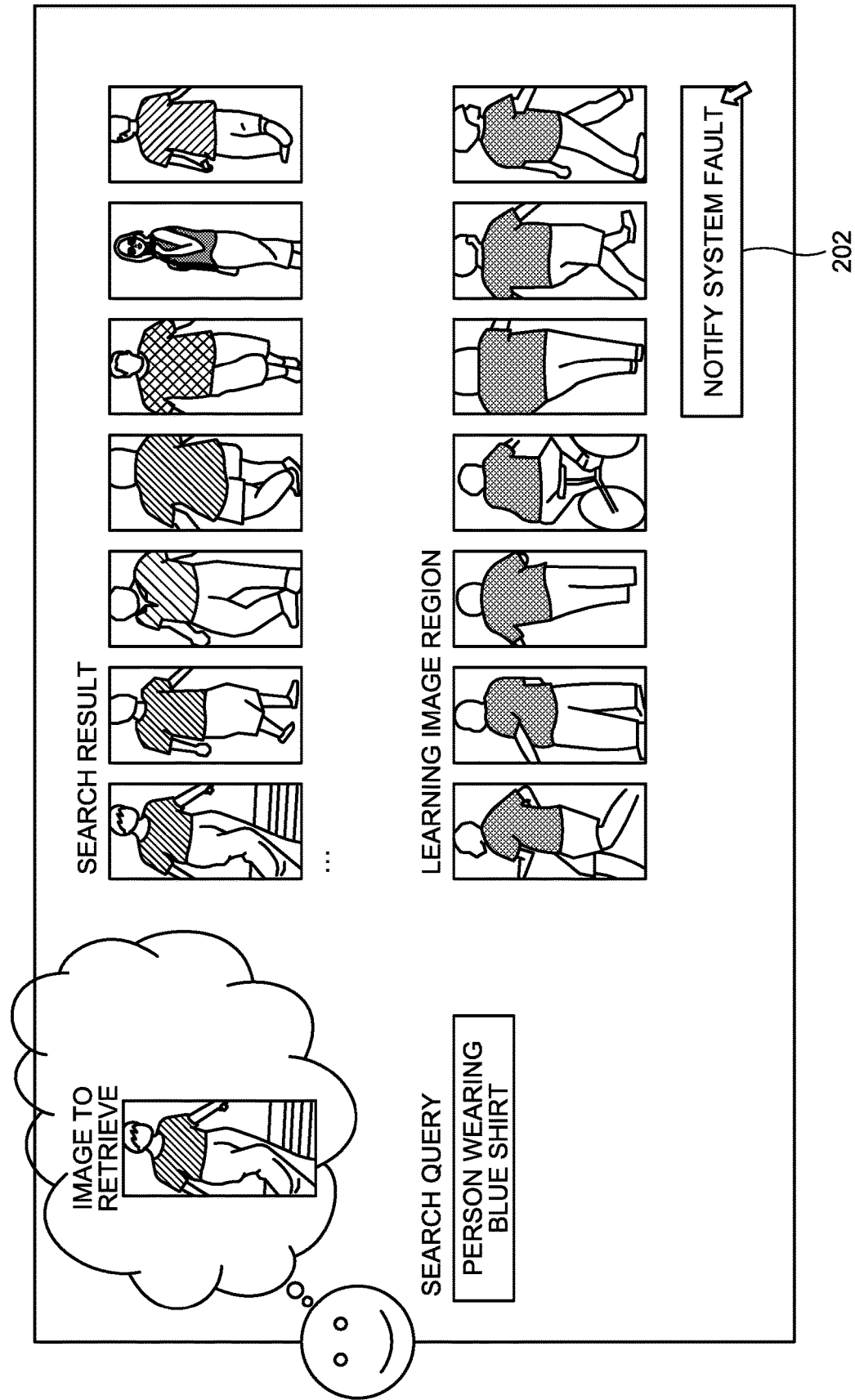
FIG. 11 is a diagram of a second example of the display information according to the fourth embodiment.

FIG. 11 is a diagram of a second example of the display information according to the fourth embodiment. In the example illustrated in FIG. 11, the learning-image-region display section (bottom row in FIG. 11) includes no learning image region similar to the intended image, while the search-result display section (top row in FIG. 11) includes the intended image. If the user determines occurrence of erroneous recognition during the extraction of the learning image regions from the learning image and presses the anomaly notification button 202, the notification controller 9 notifies the administrator of the retrieval device 100-4 of the anomaly.

Upon the anomaly notification button 202 being pressed, the display controller 6 displays, on the display, display information containing an input area into which the user can write the details of the anomaly. The display controller 6 inputs the details of the anomaly written to the input area to the notification controller 9.

The notification controller 9 transmits notification information including the search query, the search reference, and the details of the anomaly to an administrator server to notify the administrator of the retrieval device 100-4 of the anomaly.

As described above, according to the fourth embodiment, the administrator of the retrieval device 100-4 can receive notification of an anomaly in the retrieval device 100-4 from the user who has found an anomaly in the search-result display section (top row in FIG. 10) and an anomaly in the learning-image-region display section (bottom row in FIG. 11). Thereby, the administrator of the retrieval device 100-4 can promptly deal with the anomaly in the retrieval device 100-4, if it occurs, to improve the retrieval accuracy of the retrieval device 100-4.

Lastly, exemplary hardware configurations of the retrieval devices 100, 100-2, 100-3, and 100-4 according to the first to the fourth embodiments are described below. The hardware configurations of the retrieval devices 100-2, 100-3, and 100-4 according to the second to the fourth embodiments are the same as that of the retrieval device 100 according to the first embodiment. The following describes the hardware configuration of the retrieval device 100 according to the first embodiment, by way of example.

Exemplary Hardware Configuration

Figure 12:
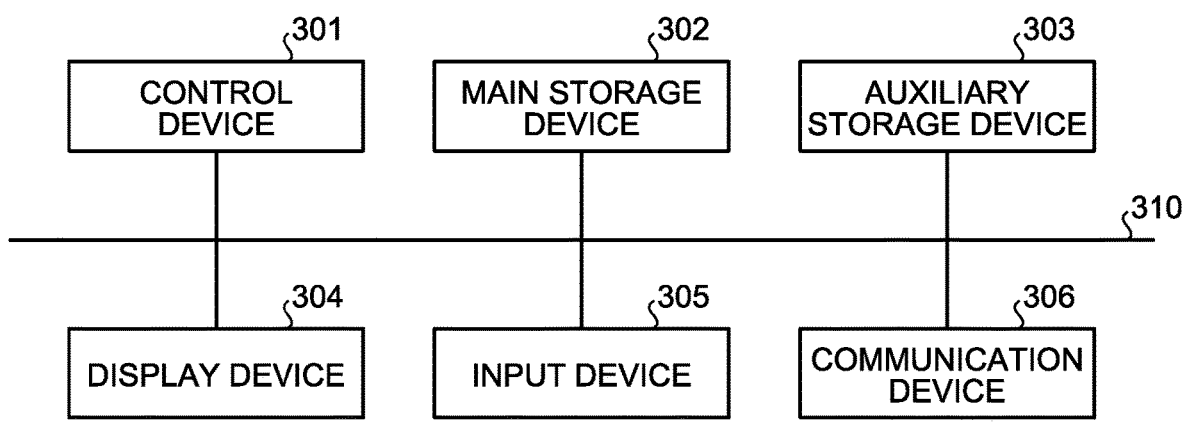
FIG. 12 is a diagram of an exemplary hardware configuration of the retrieval devices according to the first to the fourth embodiments.

FIG. 12 is a diagram of an exemplary hardware configuration of the retrieval device 100 according to the first embodiment. The retrieval device 100 according to the first embodiment includes a control device 301, a main storage device 302, an auxiliary storage device 303, a display device 304, an input device 305, and a communication device 306. The control device 301, the main storage device 302, the auxiliary storage device 303, the display device 304, the input device 305, and the communication device 306 are connected via a bus 310.

The control device 301 executes a computer program read from the auxiliary storage device 303 to the main storage device 302. The main storage device 302 represents a memory, such as a read only memory (ROM) and a random access memory (RAM). The auxiliary storage device 303 represents a hard disk drive (HDD), a memory card, or the like.

The display device 304 displays the display information. The display device 304 represents a liquid crystal display, for example. The input device 305 represents an interface for operating the retrieval device 100. The input device 305 is a keyboard and a mouse, for example. If the retrieval device 100 is a smart device, such as a smartphone and a tablet terminal, the display device 304 and the input device 305 are a touch panel, for example. The communication device 306 represents an interface for communicating with other devices.

Programs to be executed by the retrieval device 100 according to any of the embodiments are recorded in installable or executable file format on a computer-readable storage medium, such as a compact disc read only memory (CD-ROM), a memory card, a compact disc recordable (CD-R), and a digital versatile disc (DVD), and are provided as a computer program product.

The programs to be executed by the retrieval device 100 according to any of the embodiments may be stored in a computer connected to a network such as the Internet, and downloaded and provided via the network. The computer programs to be executed by the retrieval device 100 according to any of the embodiments may be provided via a network, such as the Internet, without being downloaded.

The programs to be executed by the retrieval device 100 according to any of the embodiments may be incorporated in a ROM, for example.

The programs to be executed by the retrieval device 100 according to any of the embodiments have a module configuration including functional blocks implementable by the programs, among the functional blocks described above. As actual hardware, the control device 301 reads and executes the program from the storage medium to load the functional blocks on the main storage device 302. In other words, the functional blocks are generated on the main storage device 302.

Part or all of the functional blocks described above may be implemented not by software but by hardware such as an integrated circuit (IC).

In the case of using multiple processors, each of the processors may implement one or two or more of the functions.

The operation form of the retrieval device 100 according to the embodiment may be arbitrary. The retrieval device 100 according to the embodiment may operate as a cloud system on a network, for example.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A retrieval device comprising:
  one or more hardware processors configured to:
    convert morphemes of a search query into a plurality of attributes by at least accessing a table comprising relationships between character strings of the morphemes and the plurality of attributes;
    retrieve a plurality of search image regions from a particular image by conducting an image search using the search query, the plurality of image regions comprising a first image region including a first region attribute having a first similarity score equal to or higher than a threshold score;
    sort the retrieved plurality of search image regions based at least in part on a degree of similarity of each search image region of the plurality of search image regions to obtain a sorted set of search image regions;
    store the particular image as a learning image;
    store a second region attribute of a second image region of the particular image, the second region attribute having a second similarity score higher than the first similarity score;
    extract a plurality of learning image regions from the learning image used in an image search learning process, by conducting the image search using the search query and the second region attribute; and
    display the plurality of search image regions and the plurality of learning image regions on a display, the learning image regions displayed in an order corresponding to the order of the sorted set of search image regions.

2. The device according to claim 1, wherein the one or more processors:
  analyze the first region attribute comprising an attribute of the image region of the particular image.

3. The device according to claim 2, wherein the one or more search attributes comprise at least one of name, color, pattern, shape, length, size, age, gender, or behavior.

4. The device according to claim 2, further comprising a storage that stores therein the learning image and the second region attribute comprising an attribute of an image region of the learning image, wherein
  the one or more processors extract, as the plurality of learning image regions, the image region of the learning image comprising the second region attribute with the similarity score with respect to the one or more search attributes equal to or higher than the threshold score.

5. The device according to claim 4, wherein the one or more processors:
  receive selection of one of the displayed plurality of learning image regions and set the second region attribute of the selected learning image region as a search reference for the one or more search attributes used in extraction of the selected learning image region, and
  when retrieving the image using the search attribute with the search reference, retrieve, as the plurality of search image regions, the image region comprising the first region attribute with the similarity score with respect to the second region attribute set as the one or more search references equal to or higher than the threshold score.

6. The device according to claim 5, wherein the one or more processors:
  store, in the storage, the search attribute with the search reference and the second region attribute set as the search reference in association with each other, and check whether the converted search attribute has the search reference set, by referring to the storage, and
  when the search reference is set as the search attribute, retrieve, as the plurality of search image regions, the image region comprising the first region attribute with the similarity score with respect to the second region attribute set as the search reference equal to or higher than the threshold score.

7. The device according to claim 5, wherein the one or more processors display, on the display, display information comprising a search-reference selection section and a search-result display section, the search-reference selection section displays the plurality of learning image regions in descending order of the similarity score to receive selection of the search reference from the plurality of learning image regions, the search-result display section displays the plurality of search image regions in descending order of the similarity score.

8. The device according to claim 7, wherein the one or more processors display the search-result display section on the display, and then display the search-reference selection section on the display after elapse of a certain period of time.

9. The device according to claim 7, wherein the one or more processors convert each of the plurality of learning image regions into an icon image corresponding to the second region attribute of each learning image region to display the search-reference selection section showing icon images instead of the plurality of learning image regions on the display.

10. The device according to claim 1, wherein the one or more processors issue a notification of an anomaly in the retrieval device.

11. A retrieval method, comprising:
converting morphemes of a search query into a plurality of attributes by at least accessing a table comprising relationships between character strings of the morphemes and the plurality of attributes;
retrieving a plurality of search image regions from a particular image by conducting an image search using the search query, the plurality of image regions comprising a first image region including a first region attribute having a first similarity score equal to or higher than a threshold score;
sorting the retrieved plurality of search image regions based at least in part on a degree of similarity of each search image region of the plurality of search image regions to obtain a sorted set of search image regions;
storing the particular image as a learning image;
storing a second region attribute of a second image region of the particular image, the second region attribute having a second similarity score higher than the first similarity score;
extracting a plurality of learning image regions from the learning image used in an image search learning process, by conducting the image search using the search query and the second region attribute; and
displaying the plurality of search image regions and the plurality of learning image regions on a display, the learning image regions displayed in an order corresponding to the order of the sorted set of search image regions.

12. A computer program product comprising a non-transitory computer readable medium comprising programmed instructions, the instructions causing the computer to execute:
converting morphemes of a search query into a plurality of attributes by at least accessing a table comprising relationships between character strings of the morphemes and the plurality of attributes;
retrieving a plurality of search image regions from a particular image by conducting an image search using the search query, the plurality of image regions comprising a first image region including a first region attribute having a first similarity score equal to or higher than a threshold score;
sorting the retrieved plurality of search image regions based at least in part on a degree of similarity of each search image region of the plurality of search image regions to obtain a sorted set of search image regions;
storing the particular image as a learning image;
storing a second region attribute of a second image region of the particular image, the second region attribute having a second similarity score higher than the first similarity score;
extracting a plurality of learning image regions from the existing learning image used in an image search learning process, by conducting the image search using the search query and the second region attribute; and
displaying the plurality of search image regions and the plurality of learning image regions on a display, the learning image regions displayed in an order corresponding to the order of the sorted set of search image regions.

* * * * *